US008100612B2

(12) United States Patent  
Miyanaga (10) Patent No.: US 8,100,612 B2  
(45) Date of Patent: Jan. 24, 2012

(54) CORE DRILL

(75) Inventor: Masaaki Miyanaga, Miki (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 865 days.

(21) Appl. No.: 11/886,107

(22) PCT Filed: Mar. 11, 2005

(86) PCT No.: PCT/JP2005/004335
§ 371 (c)(1),
(2), (4) Date: May 30, 2008

(87) PCT Pub. No.: WO2006/097980
PCT Pub. Date: Sep. 21, 2006

(65) Prior Publication Data
US 2008/0298915 A1    Dec. 4, 2008

(51) Int. Cl.
*B23B 51/04* (2006.01)
*B23B 51/08* (2006.01)
(52) U.S. Cl. .................. 408/206; 408/204; 408/703
(58) Field of Classification Search .............. 408/204, 408/206, 207, 703; *B23B 51/04, 51/08*
See application file for complete search history.

(56) References Cited

U.S. PATENT DOCUMENTS

| 3,672,785 | A | * | 6/1972 | Byrne | 408/206 |
| 5,167,475 | A | * | 12/1992 | Miyanaga | 408/204 |
| 6,893,194 | B2 | * | 5/2005 | Jones et al. | 408/204 |
| 6,926,476 | B1 | * | 8/2005 | Miyanaga | 408/204 |
| 7,101,124 | B2 | * | 9/2006 | Keightley | 408/204 |
| 7,384,222 | B2 | * | 6/2008 | Chao | 408/206 |
| 2008/0181738 | A1 | * | 7/2008 | Capriotti et al. | 408/207 |

FOREIGN PATENT DOCUMENTS

| DE | 3214209 A1 | * | 10/1983 |
| DE | 3423522 A1 | * | 1/1986 |
| EP | 255120 A1 | * | 2/1988 |
| EP | 458047 A1 | * | 11/1991 |
| EP | 1002606 A1 | * | 5/2000 |
| EP | 1260297 A1 |   | 11/2002 |

(Continued)

OTHER PUBLICATIONS

ISA Japan, International Search Report of PCT/JP2005/004335, Jun. 21, 2005, WIPO.

(Continued)

*Primary Examiner* — Eric A Gates
(74) *Attorney, Agent, or Firm* — Alleman Hall McCoy Russell & Tuttle LLP (57) ABSTRACT

To provide a user-friendly core drill which, when forming a large-diameter cut hole by the core drill with respect to an object to be drilled, such as concrete, is able to easily form, for example, a chamfered portion or a countersunk portion with respect to an opening end portion of the cut hole. In a core drill comprising a base body including a shank and a drill core body including a drill cutting blade, a connection opening portion of the drill core body being attached to the base body, the connection opening portion of the drill core body is provided with a concave portion forming member including a large-diameter hole cutting blade, and the large-diameter hole cutting blade is provided outside the drill cutting blade in a radial direction of the connection opening portion.

8 Claims, 8 Drawing Sheets

FOREIGN PATENT DOCUMENTS

| | | |
|---|---|---|
| FR | 2594728 A1 * | 8/1987 |
| GB | 911093 | 11/1962 |
| GB | 2144591 A * | 3/1985 |
| GB | 2364662 A * | 2/2002 |
| GB | 2405115 A | 2/2005 |
| JP | 50-105993 | 8/1975 |
| JP | 63-21511 | 2/1988 |
| JP | 05245829 A * | 9/1993 |
| JP | 10-006117 | 1/1998 |
| JP | 2000246727 A * | 9/2000 |
| JP | 2000-326126 | 11/2000 |
| JP | 2001162423 A | 6/2001 |
| JP | 2001162424 A | 6/2001 |
| JP | 2005238344 A * | 9/2005 |
| JP | 2008161990 A * | 7/2008 |

OTHER PUBLICATIONS

ISA European Patent Office, Search Report of EP 05 72 0606, Jul. 12, 2010, Netherlands, 3 pages.

* cited by examiner

CORE DRILL

TECHNICAL FIELD

The present invention relates to a core drill for use in drilling a hole, such as boring a comparatively large-diameter hole, and particularly to a core drill capable of forming a large-diameter cut hole by a core body to which a center drill is attached and also forming a countersunk portion, a chamfered portion or the like with respect to an opening end portion of the cut hole.

BACKGROUND ART

Conventionally, core drills made by combining a center drill and a tubular core body have been widely used. The core body has a drill cutting blade at a lower end opening edge portion. In accordance with the core drill, while the center drill is forming a center hole first, the core body can subsequently form a large-diameter hole.

As the core drill of this type, there is a core drill in which a base body including a shank and a core body having a drill cutting blade at a lower end opening edge portion are constructed as separate parts. Various constructions in which the core body detachably attached to the base body is locked by a connection holding means have been proposed (see Japanese Unexamined Patent Application Publication No. 2000-326126.)

An attachment structure of the core body with respect to the base body of the core drill described in Patent Document 1 includes an attachment plate provided on a lower end of the base body including the shank. A core body attachment portion is provided on a lower portion of the attachment plate, and hook-like concave engagement grooves are formed at a plurality of positions on the outer peripheral surface of the core body attachment portion. A tubular connection opening portion into which the core body attachment portion of the base body is fittingly inserted is formed at an upper end opening of the core body. On the inner surface of the connection opening portion, engagement projections are formed, which engage with and disengage from the engagement grooves of the core body attachment portion. When attaching the core body to the base body, the core body attachment portion of the base body is fittingly inserted into the connection opening portion of the core body, so that the engagement projections engage with end portions of the engagement grooves. Then, the core body at this position is locked by the connection holding means attached to the base body.

In accordance with the core drill thus constructed, the base body and the core body can be connected to and separated from each other by simple operations. Therefore, the core drill is convenient in that, for example, after having formed a cut hole on an object to be drilled, such as a concrete material, using an electric drill to which the core drill is applied, cut masses remaining in the core body can be easily removed by separating the base body and the core body from each other. Moreover, after attaching the core body to the base body, the connection holding means attached to the base body can fix the core body and the base body in a state where the base body and the core body are surely connected to each other. Therefore, loosening, etc. between the base body and the core body do not occur during the drilling operation.

The cut hole formed on concrete or the like by using the core drill is used, for example, to allow a pipe or the like having a size corresponding to the diameter of the cut hole to be inserted therethrough. However, an opening edge of the cut hole formed on concrete or the like by using the core drill is square. Therefore, to facilitate the insertion of an end portion of the pipe into the cut hole, it is necessary to chamfer the opening edge. Moreover, to allow a bolt or a screw to be inserted into the cut hole, it is necessary to form on the opening end portion a countersunk portion having a size capable of accommodating a head portion of the bolt.

However, at a worksite, for example, manually chamfering, by a worker using a cutting tool, the opening edge of the cut hole formed on concrete or the like by the core drill takes a lot of time and labor, and this deteriorates the work efficiency and personnel expenses increase, thereby leading to the increase in cost. Therefore, the accuracy improvement of the finished chamfered portion may not be realized.

DISCLOSURE OF THE INVENTION

Problems to be Solved by the Invention

The present invention was made to solve the above problems, and an object of the present invention is to provide a user-friendly core drill which when drilling by the core drill a large-diameter cut hole in an object to be drilled such as concrete, can easily form a chamfered portion, a stepped-down countersunk portion or the like with respect to the opening end portion of the cut hole.

Means for Solving the Problems

To achieve the above object, a core drill according to the present invention comprises: a base body including a shank; and a drill core body including a drill cutting blade, a connection opening portion of the drill core body being attached to the base body, wherein the connection opening portion of the drill core body is provided with a concave portion forming member including a large-diameter hole cutting blade, and the large-diameter hole cutting blade is provided outside the drill cutting blade in a radial direction of the connection opening portion.

In accordance with the core drill of the present invention thus constructed, drilling a hole by the drill core body with respect to an object to be drilled is carried out in the same manner as drilling a hole by a conventional core drill. When the drilling by the drill cutting blade proceeds and the concave portion forming member contacts the surface of the object to be drilled, a cut processing by the large-diameter hole cutting blade starts with respect to an opening end portion of the cut hole formed by the drill cutting blade.

After finishing a predetermined cut processing by the large-diameter hole cutting blade, the drill core body is separated from the object to be drilled together with the large-diameter hole cutting blade. Thus, forming the cut hole by the drill cutting blade and forming a concave portion with respect to the opening end portion of the cut hole by the large-diameter hole cutting blade can be carried out in one step. The concave portion is, for example, a countersunk portion, a chamfered portion or an annular groove portion.

In the core drill according to the present invention, the connection opening portion of the drill core body may be detachably attached to the base body, and the concave portion forming member may be detachably attached to the connection opening portion. With this, among a plurality of drill core bodies and concave portion forming members which are different from each other in, for example, size and/or shape, a desired drill core body and concave portion forming member can be used by attaching them to the base body.

Moreover, in the core drill according to the present invention, the large-diameter hole cutting blade may be a countersinking cutting blade which forms a countersunk portion with respect to the cut hole formed by the drill cutting blade. With this, the countersunk portion can be formed with respect to the opening end portion of the cut hole formed by the drill cutting blade.

Further, in the core drill according to the present invention, the large-diameter hole cutting blade may be a chamfering cutting blade whose cutting edge is inclined with respect to a center axis direction of the base body and which forms a chamfered portion with respect to the cut hole formed by the drill cutting blade. With this, the chamfered portion can be formed with respect to the opening end portion of the cut hole formed by the drill cutting blade.

Then, in the core drill according to the present invention, an inner periphery of a rotational trajectory formed when the large-diameter hole cutting blade rotates can be set to contact or overlap an outer periphery of a rotational trajectory formed when the drill cutting blade rotates. With this, by carrying out a predetermined cut processing using the drill cutting blade, and the countersinking cutting blade or the chamfering cutting blade, forming the cut hole by the drill cutting blade, and forming the countersunk portion by the countersinking cutting blade with respect to the opening end portion of the cut hole or forming the chamfered portion by the chamfering cutting blade with respect to the opening end portion of the cut hole can be carried out in one step.

Moreover, in the core drill according to the present invention, the large-diameter hole cutting blade may be a groove cutting blade which forms an annular groove portion which is located outside the cut hole, formed by the drill cutting blade, so as to be spaced apart from the cut hole. With this, around the opening end portion of the cut hole formed by the drill cutting blade with respect to the object to be drilled, the annular groove portion is formed by the large-diameter hole cutting blade so as to be spaced apart from the cut hole and to be concentric with the cut hole, and a cylindrical remaining portion remains between the annular groove portion and the cut hole. Since the cylindrical remaining portion can be formed so as to be comparatively thin and weak, it can be completely removed by, for example, using a simple tool, and the remaining surface is easily leveled. Thus, the countersunk portion can be formed with respect to the opening end portion of the cut hole. Therefore, by changing the size and/or attachment position of the large-diameter hole cutting blade, the countersunk portion having a desired size can be formed with respect to the opening end portion of the cut hole formed by the drill cutting blade.

Further, in the core drill according to the present invention, a cutting concave portion may be formed at an opening edge of the connection opening portion of the drill core body; an engagement projection shaped so as to correspond to the cutting concave portion may be formed at a connection opening portion of the concave portion forming member; and the engagement projection may engage with the cutting concave portion so that the drill core body and the concave portion forming member are connected to each other so as not to be rotatable in a circumferential direction. With this, as the attachment structure of the drill core body to the base body, a conventional structure can be used. Then, by causing the cutting concave portion formed on the connection opening portion of the drill core body and the engagement projection formed on the connection opening portion of the concave portion forming member to engage with each other, the concave portion forming member can be attached to the drill core body. Thus, since the core drill can be constructed simply, it is possible to reduce the production cost.

Then, in the core drill according to the present invention, the concave portion forming member may include a concave portion core body which is radially larger than the drill core body; the large-diameter hole cutting blade may be provided at a lower end opening edge portion of the concave portion core body; an upper end opening portion of the concave portion core body may be reduced in diameter so as to form a connection opening portion; and the connection opening portion may externally fit the connection opening portion of the drill core body so as to be connected thereto. With this, in a state where the concave portion core body and the drill core body are connected to each other, these core bodies are provided such that those centers are identical with each other, and part of the drill core body is stored inside the concave portion core body. Therefore, it is possible to realize a comparatively small core drill as a whole. On this account, the core drill is conveniently portable, and requires a small storage space.

Moreover, in the core drill according to the present invention, the concave portion forming member may be radially larger than the drill core body and may include a concave portion disc having a connection opening portion at a center portion thereof, and the large-diameter hole cutting blade may be provided on a lower surface of the concave portion disc so as to extend downwardly therefrom. The large-diameter hole cutting blade used for the concave portion disc is made of, for example, a cemented carbide tip having an attachment portion at its base portion and a predetermined length. The large-diameter hole cutting blade can be implanted in a cutting blade implanted hole formed on the concave portion disc.

To be specific, for example, the concave portion disc is provided with a plurality of cutting blade implanted holes along each of a plurality of circumferences which are different from each other in a distance from the rotational center of the concave portion disc. In the case of using the concave portion disc, for example, it can be used by implanting the large-diameter hole cutting blades in the cutting blade implanted holes arranged along one certain circumference. Moreover, the shape, material, and/or the like of the large-diameter hole cutting blade to be used can be changed depending on the type of the object to be drilled, and the number of the large-diameter hole cutting blades to be used by being implanted can be increased or decreased. Therefore, it is possible to form a precisely-sized complete concave portion having a desired size and shape with respect to the object to be drilled.

Further, in the core drill according to the present invention, the base body may include a connection holding means; the connection holding means may include a core body attachment portion having a shoulder portion formed at a lower portion of the base body; the shoulder portion may be formed at an outer peripheral portion of the attachment plate; and the drill core body may be attached to the base body in such a manner that: the core body attachment portion is fittingly inserted into the connection opening portion of the drill core body; the engagement projection projecting in the connection opening portion engages with an engagement concave portion provided on the core body attachment portion; and the concave portion forming member attached to the drill core body is fixed to the core body attachment portion by causing the shoulder portion of the core body attachment portion to press contact the engagement projection provided on the connection opening portion. With this, by operating the connection holding means, attaching and detaching of the drill core body and the concave portion forming member to and from the base body and connecting and separating of the drill core body to and from the concave portion forming member can be carried out easily. Therefore, the core drill can be made easy to handle.

Effects of the Invention

In accordance with the present invention, a cut hole can be formed by a core drill with respect to an object to be drilled, and a concave portion, such as a chamfered portion, a countersunk portion or an annular groove portion, can be formed through one step with respect to an opening end portion of the cut hole. Therefore, the cut hole and the countersunk portion, etc. can be easily formed in a short period of time. In addition, for example, in the case of forming a cut hole by a drill core body and forming an annular groove portion outside the cut hole by a concave portion forming member so that the annular groove portion is spaced apart from the cut hole, a cylindrical remaining portion remains between the cut hole and the annular groove portion. However, the countersunk portion can be formed by removing the remaining portion. Thus, by using the core drill, it is possible to easily form a high-quality concave portion with respect to the cut hole.

BRIEF DESCRIPTION OF THE DRAWINGS

FIG. 2(a) is a plan view, and FIG. 2(b) is a partially cutaway cross-sectional view.

FIG. 3(a) is a plan view, FIG. 3(b) is a partial cross-sectional view, and FIG. 3(c) is a lower end surface view.

FIG. 4(a) is a cross-sectional view showing that a countersinking cutting blade is attached, FIG. 11(b) is a cross-sectional view showing that a chamfering cutting blade is attached, and FIG. 11(c) is a cross-sectional view showing that a groove cutting blade is attached.

EXPLANATION OF REFERENCE NUMBERS 1 base body
2 drill core body
3 concave portion forming member
3a concave portion core body
3b concave portion core body
3c concave portion disc
4 center drill
5 shank
6 attachment plate
7 shoulder portion
8 core body attachment portion
9 vertical groove portion
10 engagement concave portion
11 connection opening portion
   11a connection opening portion
   11b connection opening portion
12 engagement projection
13 drill cutting blade
14 cutting concave portion
15 countersinking cutting blade
   15a chamfering cutting blade
16 engagement projection
17 connection holding means
18 stopper member
19 compression spring
30 base body
31 shank portion
32 screw portion
33 hole
34 tightening board
35 core body attachment portion
37 open ring

BEST MODE FOR CARRYING OUT THE INVENTION

Hereinafter, preferred embodiments of a core drill according to the present invention will be explained in reference to the drawings. The core drill can, at construction sites, civil engineering construction sites, etc., not only form a large-diameter hole (cut hole) with respect to concrete, stone, etc. but also easily form, for example, a countersunk portion or a chamfered portion with respect to an opening end portion of the large-diameter hole.

Embodiment 1

Figure 1:
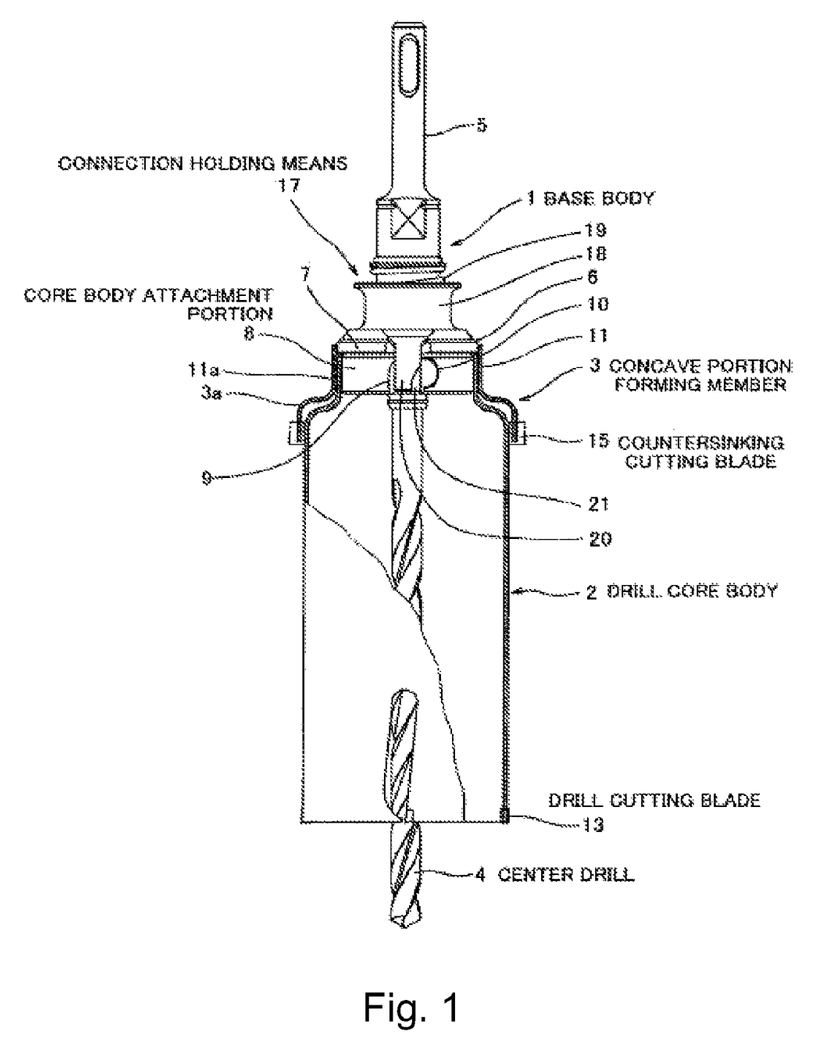
FIG. 1 is a partial cross-sectional front view showing a core drill of Embodiment 1 according to the present invention.
Figure 2:
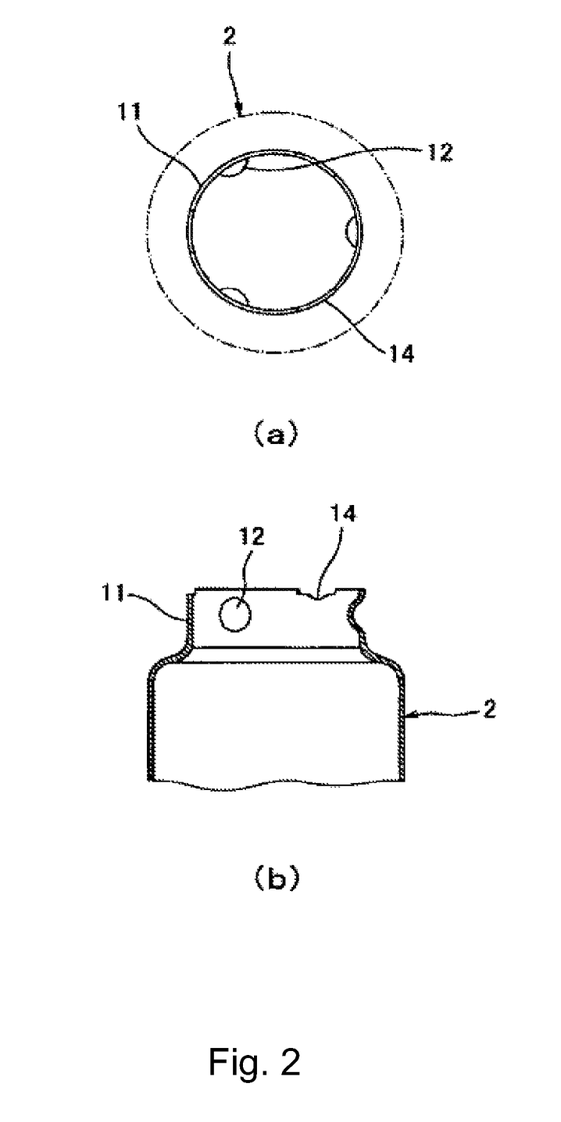
FIG. 2 show a connection opening portion of a drill core body used in the core drill of Embodiment 1.
Figure 3:
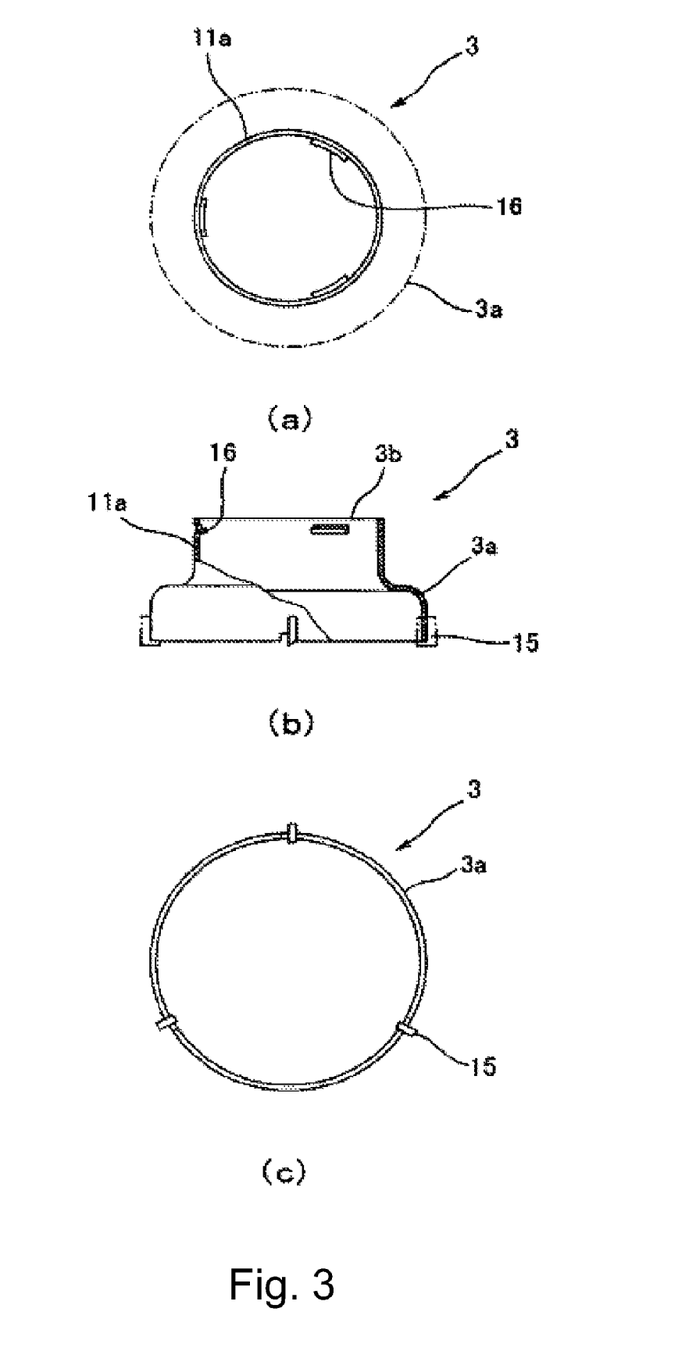
FIG. 3 show a concave portion forming member used together with the drill core body in the core drill of Embodiment 1.
Figure 4:
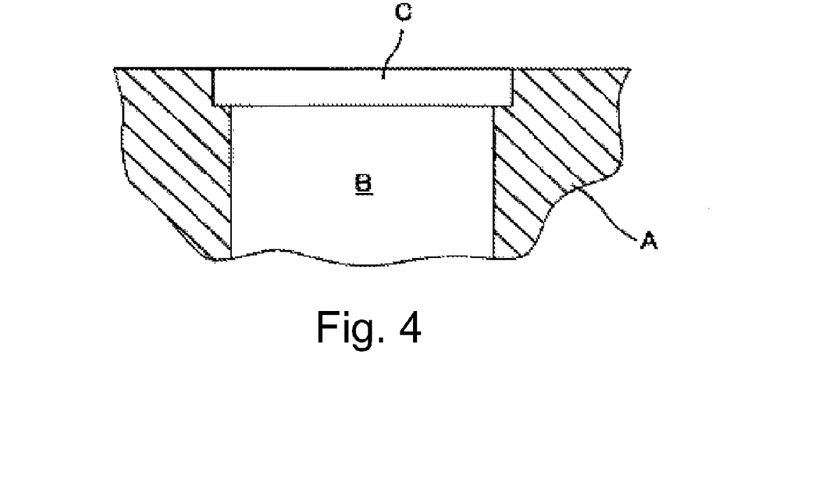
FIG. 4 is a longitudinal sectional view of a cut hole formed with respect to an object to be drilled by the core drill of Embodiment 1.

FIGS. 1 to 4 show Embodiment 1 of a core drill according to the present invention. As shown in FIG. 4, the core drill forms a cut hole B with respect to an object to be drilled A, and also forms a countersunk portion C with respect to an opening end portion of the cut hole B. FIG. 1 is a front view of the core drill partially shown by a cross-section. FIG. 2 show a connection opening portion of a drill core body used in the core drill. FIG. 2(a) is a plan view, and FIG. 2(b) is a partial cross-sectional view. FIG. 3 show a concave portion forming member used by being attached to the drill core body. FIG. 3(a) is a plan view, FIG. 3(b) is a partial cross-sectional view, and FIG. 3(c) is a lower end surface view.

In FIG. 1, reference number 1 denotes a base body, reference number 2 denotes a drill core body attached to the base body 1, reference number 3 denotes a concave portion forming member attached to the base body 1 together with the drill core body 2, and reference number 4 denotes a center drill attached to the center of the base body 1 in the drill core body 2. The drill core body 2 serves to form the cut hole B shown in FIG. 4, and the concave portion forming member 3 serves to form the countersunk portion C.

As shown in FIG. 1, the base body 1 has a shank 5 at its upper portion. The shank 5 is supported by a chuck (not shown) which is driven to rotate. An attachment plate 6 is provided at a lower portion of the base body 1. A core body attachment portion 8 is formed on a lower surface of the attachment plate 6, and an outer peripheral portion of the attachment plate 6 is formed so as to have a stepped shape as a shoulder portion 7 which projects outwardly in a radial direction of the core body attachment portion 8. Three vertical groove portions 9 are formed to extend upward from a lower end of the core body attachment portion 8, for example. Engagement concave portions 10 connected to the vertical groove portions 9 are formed along a circumferential direction on a peripheral surface of the core body attachment portion 8.

As shown in FIGS. 1 and 2, the drill core body 2 has a cylindrical shape, and includes at its upper end portion a tubular connection opening portion 11 into which the core body attachment portion 8 of the base body 1 is fittingly inserted. On an inner surface of the connection opening portion 11, three engagement projections 12 are provided, which can engage with and disengage from the engagement concave portions 10 through the vertical groove portions 9 of the core body attachment portion 8. At the lower end opening edge portion of the drill core body 2, a plurality of drill cutting blades 13 made of cemented carbide tips are provided. At an opening edge of the connection opening portion 11 of the core body 2, for example, three cutting concave portions 14 are provided, which are connected to the concave portion forming member 3.

As shown in FIGS. 1 and 3, the concave portion forming member 3 of Embodiment 1 has a cylindrical concave portion core body 3a which is radially larger than the drill core body 2, and includes at a lower end opening edge portion of the concave portion core body 3a a plurality of countersinking cutting blades 15 made of cemented carbide tips. An upper end opening portion of the core body 3a is subjected to a diameter reduction processing so as to be formed as a connection opening portion 11a which externally fits the connection opening portion 11 of the drill core body 2 so as to be connected thereto. At the opening edge portion of the connection opening portion 11a, three engagement projections 16 are provided, which project inwardly so as to be able to engage with and disengage from the cutting concave portions 14 of the drill core body 2. By causing the engagement projections 16 to engage with the cutting concave portions 14, the concave portion core body 3a and the drill core body 2 are connected to each other so as not to be rotatable in a circumferential direction. To be specific, in this state of connection, the engagement projections 16 can fit in the cutting concave portions 14 in a state where the lower surfaces and side surfaces of the engagement projections 16 contact the inner surfaces of the cutting concave portions 14. Then, by causing the core body attachment portion 8 of the base body 1 to be fittingly inserted into the connection opening portion 11 of the drill core body 2, the shoulder portion 7 is stored in the connection opening portion 11a of the concave portion core body 3a, and the lower surface of the shoulder portion 7 press contacts the upper surfaces of the engagement projections 16. Moreover, the length of an inwardly facing end surface of the engagement projection 16 is defined such that the inwardly facing end surface is coplanar with the inner peripheral surface of the connection opening portion 11 of the drill core body 2.

As shown in FIG. 1, a known drill bit is used as the center drill 4. The center drill 4 is stored in the drill core body 2. Although not shown, the base portion of the center drill 4 is fittingly inserted into a drill attachment hole formed at the center of the base body 1, and is detachably fixed by, for example, fixing screws which are threaded, from a side of the base body 1.

Note that a basic construction of the core drill in which the drill core body 2 and the center drill are combined with the base body 1 is equivalent to a known core drill of this type.

The drill core body 2 and the concave portion forming member 3 are detachably fixed to the base body 1 by a connection holding means 17 attached to the base body 1. As a specific construction of the connection holding means 17, it includes a stopper member 18 which is vertically movable with respect to the base body 1, and downwardly biases the stopper member 18 by a compression spring 19. Then, for example, three engagement claws 20 extending downwardly toward the vertical groove portions 9 from a lower end outer edge of the stopper member 18 are formed so as to be able to be inserted into and get out of the vertical groove portions 9. The engagement claw 20 has a cutout concave portion 21 at its side edge portion corresponding to the engagement concave portion 10 of the core body attachment portion 8. The cutout concave portion 21 is shaped so as to extend upwardly from a lower end of the engagement claw 20.

In the above construction, when attaching the drill core body 2 and the concave portion core body 3a to the core body attachment portion 8 of the base body 1, first, the connection opening portion 11a of the concave portion core body 3a externally fits the connection opening portion 11 of the drill core body 2 so as to be connected thereto. Here, the engagement projections 16 of the concave portion core body 3a engage with the cutting concave portions 14 of the drill core body 2. Then, the core body attachment portion 8 is fittingly inserted into the connection opening portion 11 of the drill core body 2 by holding the shank 5 of the base body 1. Against the biasing force of the compression spring 19, the lower ends of the engagement claws 20 at down positions in the vertical groove portions 9 contact the engagement projections 12 in the connection opening portion 11 of the drill core body 2, and in this state, the core body attachment portion 8 is pushed into the connection opening portion 11. Then, the stopper member 18 is pushed upwardly by the engagement claws 20 along the base body 1 against the compression spring 19, and the shoulder portion 7 of the core body attachment portion 8 contacts the engagement projections 16 of the concave portion core body 3a which engage with the cutting concave portions 14 of the drill core body 2. By causing the drill core body 2 to relatively rotate with respect to the base body 1 in a circumferential direction, the engagement projections 12 in the connection opening portion 11 move from the vertical groove portions 9 to the engagement concave portions 10. When the engagement projections 12 reach innermost engagement endpoints of the engagement concave portions 10, the lower ends of the engagement claws 20 disengage from the engagement projections 12, the engagement claws 20 move downwardly into the vertical groove portions 9 by the biasing force of the compression spring 19, and the engagement projections 12 which protrude on the vertical groove portions 9 side move into and contact the cutout concave portions 21 of the engagement claws 20. Thus, the drill core body 2 can be locked (fixed) to the core body attachment portion 8. Moreover, since the shoulder portion 7 of the base body 1 press contacts the engagement projections 16 provided on the opening edge portion of the concave portion core body 3a, the concave portion core body 3a can be locked to the core body attachment portion 8 together with the drill core body 2.

In the case of separating the drill core body 2 and the concave portion forming member 3 from the base body 1, the stopper member 18 is pulled up toward an upward direction of the base body 1 against the compression spring 19. Thus, the engagement claws 20 are away from the engagement projections 12 of the drill core body 2 to cancel the locking of the drill core body 2. Thereafter, by carrying out steps opposite to the above steps, the base body 1 and the drill core body 2 can be separated from each other.

As shown in FIG. 1, in the core drill of Embodiment 1, the cutting blades 13 and 15 are set such that the outer periphery of a rotational trajectory formed when the drill cutting blades 13 of the drill core body 2 rotate overlaps the inner periphery of a rotational trajectory formed when the countersinking cutting blades 15 rotate. Of course, the cutting blades 13 and 15 may be set such that the outer periphery of the rotational trajectory of the drill cutting blades 13 contacts the inner periphery of the rotational trajectory of the countersinking cutting blades 15.

Drilling a hole by using the core drill of Embodiment 1 with respect to an object to be drilled will be explained below. Regarding the drilling by the drill cutting blades 13, as with the drilling by conventional core drills, the center drill 4 drills a center hole first, this drilling proceeds, and then the drill cutting blades 13 contact the surface of the object to be drilled so as to form a cut hole. Then, the countersinking cutting blades 15 contact the opening end portion of the cut hole, formed by the drill cutting blades 13, so as to continuously carry out a cut processing with respect to an outer peripheral portion of the opening end portion. Then, after finishing a predetermined cut processing by the drill cutting blades 13 and the countersinking cutting blades 15, as shown in FIG. 4, the cut hole B can be formed by the drill cutting blades 13 with respect to the object to be drilled A, and the countersunk portion C can be formed by the countersinking cutting blades 15 with respect to the opening end portion of the cut hole B so as to have a stepped-down shape. In addition, the cut hole B and the countersunk portion C can be formed through one step.

Embodiment 2

Figure 5:
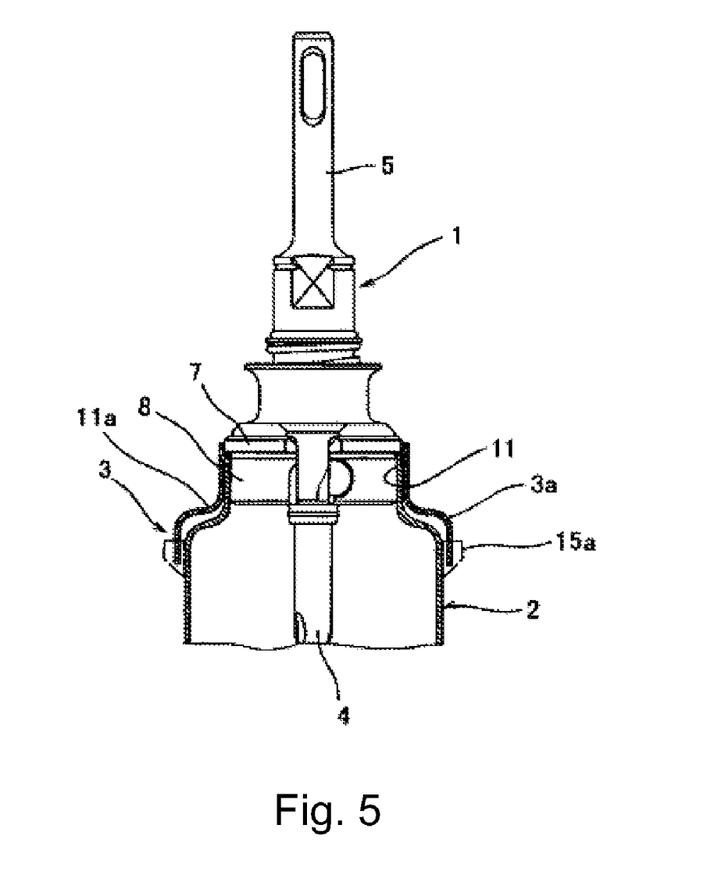
FIG. 5 is a partial cross-sectional front view showing main portions of a core drill of Embodiment 2 according to the present invention.
Figure 6:
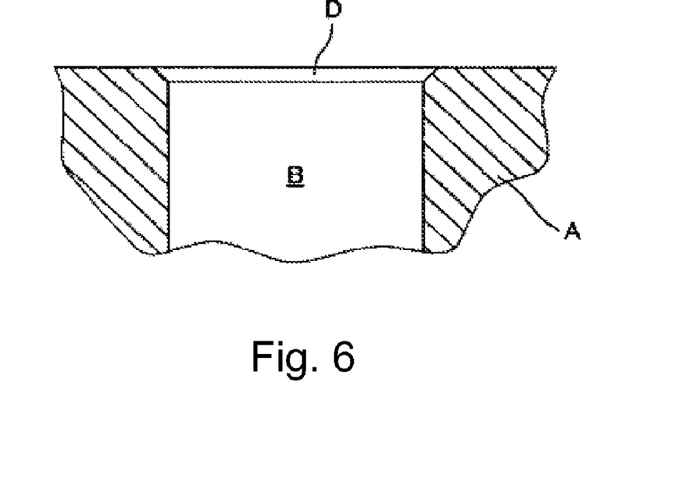
FIG. 6 is a longitudinal sectional view of a cut hole formed with respect to an object to be drilled by the core drill of Embodiment 2.

FIGS. 5 and 6 show Embodiment 2 of a core drill according to the present invention. As shown in FIG. 6, the core drill serves to form the cut hole B with respect to the object to be drilled A, and also serves to form a chamfered portion D with respect to the opening end portion of the cut hole B. FIG. 5 is a partial cross-sectional view of main portions of the core drill.

The core drill of Embodiment 2 shown in FIG. 5 uses the concave portion core body 3a having the same size as the concave portion core body 3a of Embodiment 1 shown in FIG. 1. However, in Embodiment 2, instead of the countersinking cutting blades 15 of Embodiment 1, chamfering cutting blades 15a are provided on the core body 3a for use in chamfering. The cutting edge of the chamfering cutting blade 15a is formed as an inclined blade which is inclined with respect to a center axis direction of the base body 1 so as to be able to carry out chamfering.

Note that the core drill of Embodiment 2 shown in FIG. 5 has the same construction as that of Embodiment 1 shown in FIG. 1 except for the chamfering cutting blades 15a, and the procedure of drilling is also the same between the core drill of Embodiment 2 and the core drill of Embodiment 1, so detailed explanations thereof are omitted here.

After finishing a predetermined cut processing for drilling a hole with respect to the object to be drilled A by using the core drill of Embodiment 2 shown in FIG. 5, as shown in FIG. 6, the cut hole B can be formed by the drill cutting blades 13 with respect to the object to be drilled A, and the inclined chamfered portion D can be formed by the chamfering cutting blades 15a with respect to the opening end portion of the cut hole B. In addition, the cut hole B and the chamfered portion D can be formed in one step.

Embodiment 3

Figure 7:
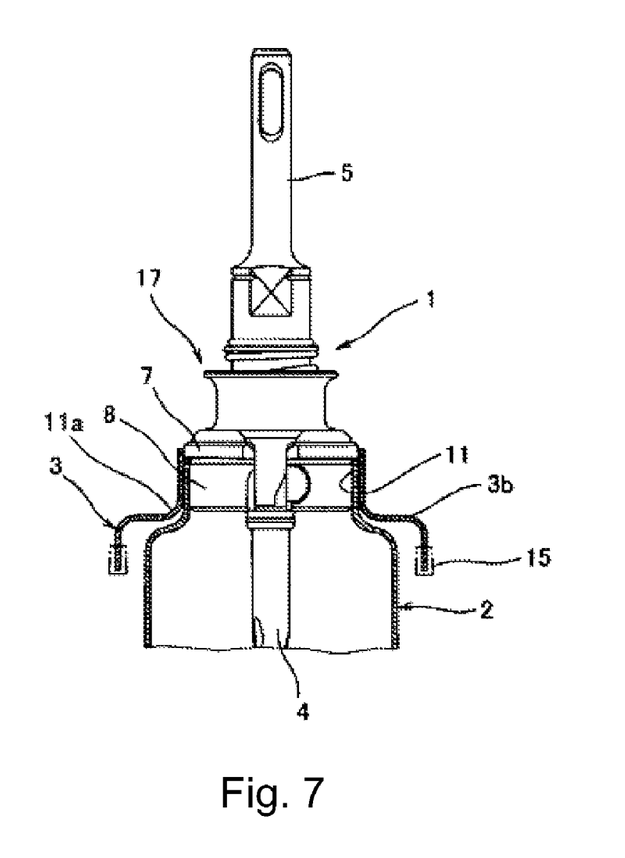
FIG. 7 is a partial cross-sectional front view showing main portions of a core drill of Embodiment 3 according to the present invention.
Figure 8:
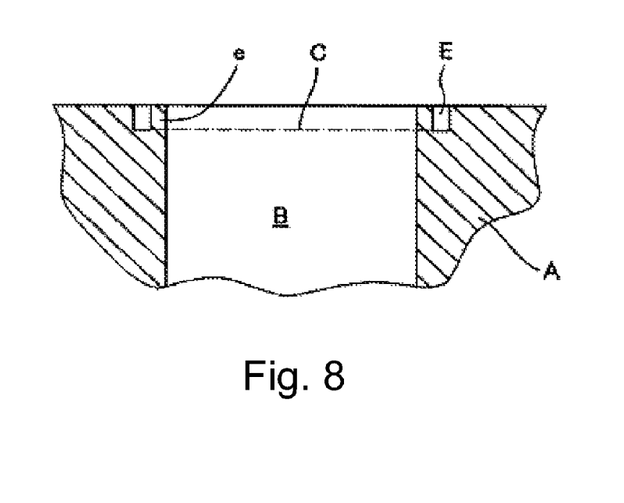
FIG. 8 is a longitudinal sectional view of a cut hole formed with respect to an object to be drilled by the core drill of Embodiment 3.

FIGS. 7 and 8 show Embodiment 3 of a core drill according to the present invention. As shown in FIG. 8, the core drill serves to form the cut hole B with respect to the object to be drilled A, and also serves to form an annular groove portion E, having a larger diameter than the cut hole B, with respect to an opening end portion of the cut hole B. FIG. 7 is a partial cross-sectional view showing main portions of the core drill.

The core drill of Embodiment 3 shown in FIG. 7 includes a concave portion core body 3b. The concave portion core body 3b is formed so as to be radially larger than the concave portion core body 3a of Embodiment 1 shown in FIG. 1. The countersinking cutting blades (groove cutting blades) 15, provided on a lower end edge portion of the concave portion core body 3b, are set such that the rotational trajectory formed when the countersinking cutting blades 15 rotate is spaced apart from the rotational trajectory formed when the drill cutting blades 13 rotate so as to be located outside the rotational trajectory formed when the drill cutting blades 13 rotate.

The core drill of Embodiment 3 shown in FIG. 7 has the same construction as the core drill of Embodiment 1 shown in FIG. 1 except that the rotational trajectory of the groove cutting blades 15 and the rotational trajectory of the drill cutting blades 13 are spaced apart from each other, and the procedure of drilling is also the same between the core drill of Embodiment 3 and the core drill of Embodiment 1, so detailed explanations thereof are omitted here.

After finishing a predetermined cut processing for drilling a hole with respect to the object to be drilled A by using the core drill of Embodiment 3 shown in FIG. 7, as shown in FIG. 8, the cut hole B can be formed by the drill cutting blades 13 with respect to the object to be drilled A, and the annular groove portion E having a larger diameter than the cut hole B can be formed outside the opening end portion of the cut hole B by the groove cutting blades 15. Here, a cylindrical remaining portion e is formed between the cut hole B and the annular groove portion E. By removing the cylindrical remaining portion e, the countersunk portion C (shown by a dashed line) having an intended size can be obtained. The cylindrical remaining portion e may be removed by, for example, using a simple tool at worksites to form a countersunk surface.

Embodiment 4

Figure 9:
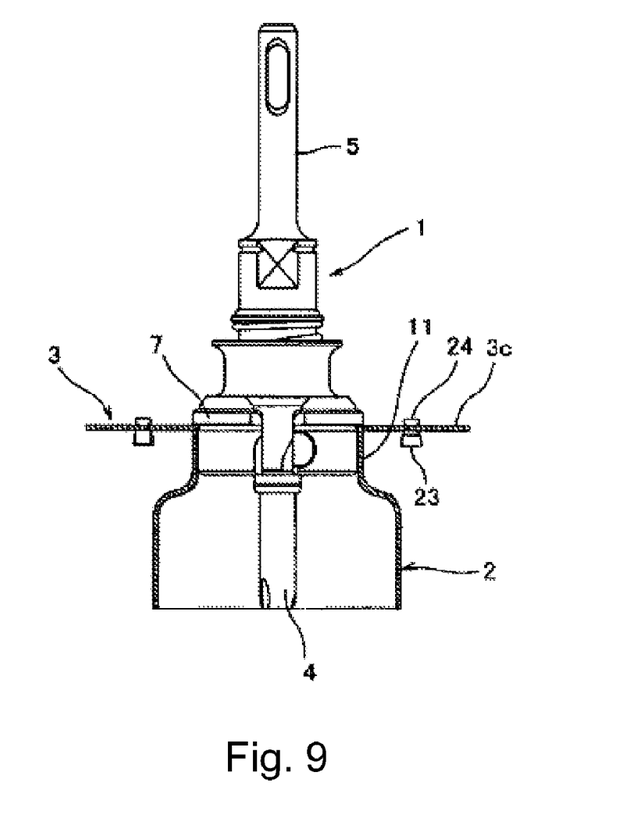
FIG. 9 is a partial cross-sectional front view showing main portions of a core drill of Embodiment 4 according to the present invention.
Figure 10:
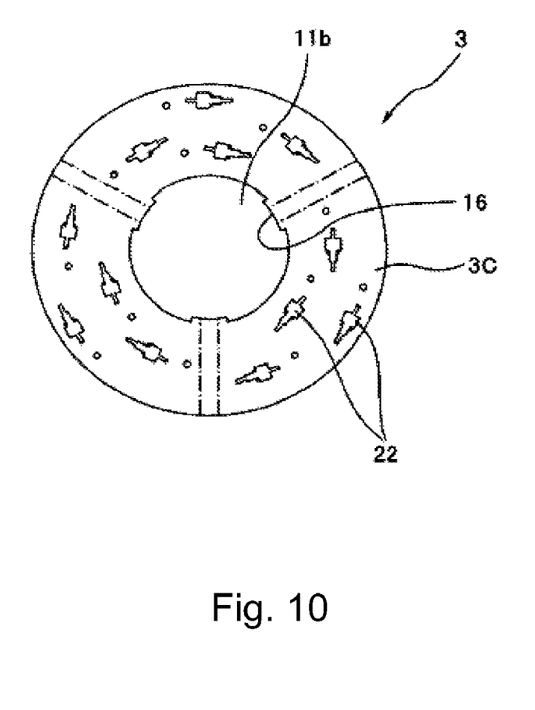
FIG. 10 is a plan view showing a concave portion disc of Embodiment 4.
Figure 11:
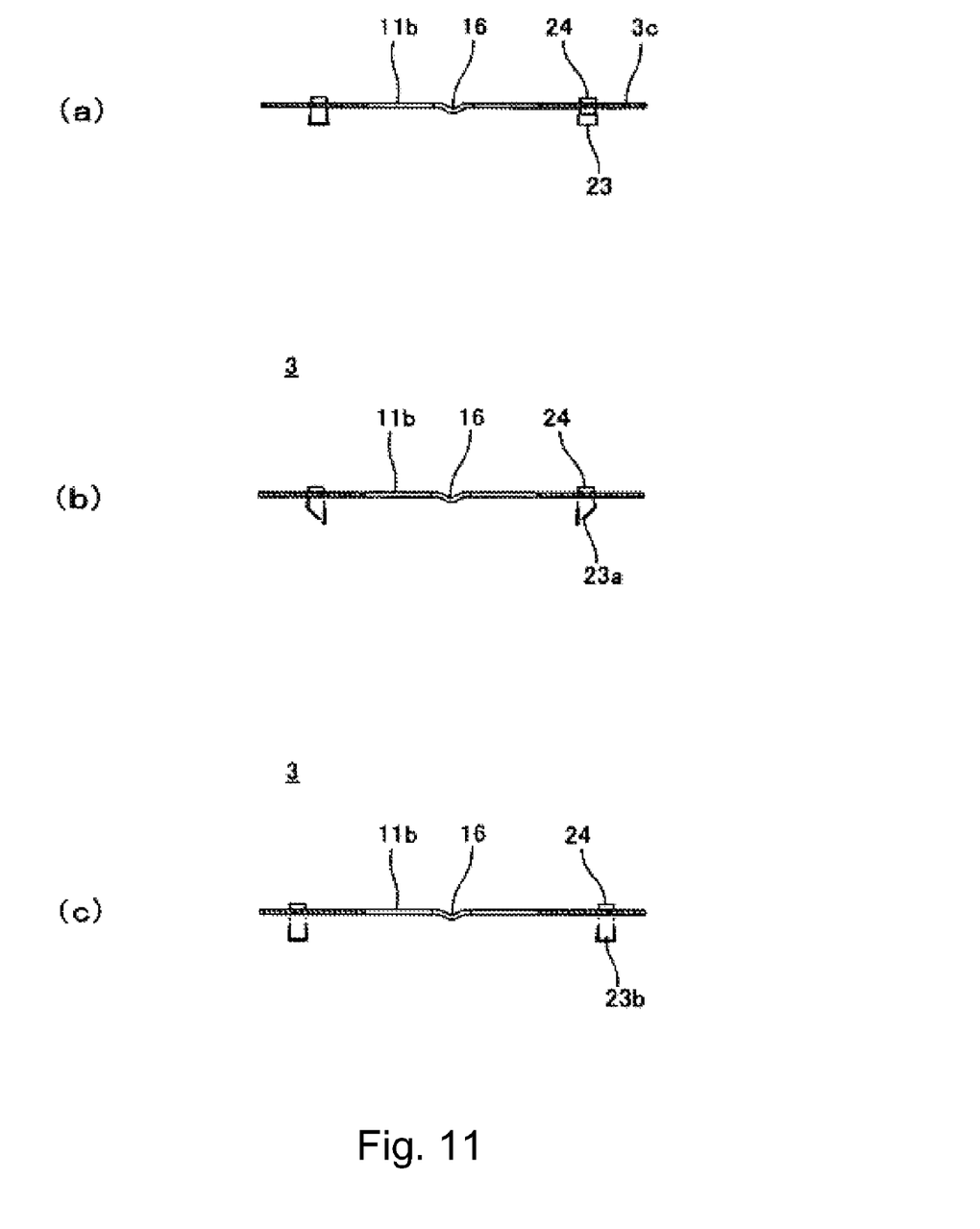
FIG. 11 are cross-sectional views of the concave portion disc of Embodiment 4.

FIGS. 9 to 11 show Embodiment 4 of a core drill according to the present invention. FIG. 9 is a partial cross-sectional view showing main portions of the core drill. FIG. 10 is a plan view of a concave portion disc 3c. FIGS. 11(a), 11(b) and 11(c) are cross-sectional views each showing the concave portion disc 3c to which countersinking cutting blades 23, chamfering cutting blades 23a or groove cutting blades 23b are attached.

Instead of the concave portion core body 3a of Embodiment 1 shown in FIG. 1, the core drill of Embodiment 4 shown in FIG. 9 uses the concave portion disc 3c which is radially larger than the drill core body 2 and is made of a metallic plate. As shown in FIG. 10, the concave portion disc 3c is formed by carrying out a punch processing with respect to the metallic plate. The concave portion disc 3c has a connection opening portion 11b at its center portion. The connection opening portion 11b has on its inner edge the engagement projections 16 projecting toward a center direction. The concave portion disc 3C is provided with a plurality of cutting blade implanted holes 22 along each of a plurality of (for example, three) circumferences which are different from each other in a distance from the rotational center of the concave portion disc 3C. The countersinking cutting blades 23 can be attached to the cutting blade implanted holes 22 by insertion. The countersinking cutting blades 23 are attached so as to project downwardly from the lower surface of the concave portion disc 3C. The countersinking cutting blades 23 are made of cemented carbide tips, and attachment portions 24 provided on base portions of the countersinking cutting blades 23 are detachably attached to the cutting blade implanted holes 22 by a well known method.

In the core drill of Embodiment 4 shown in FIG. 9, the concave portion disc 3c made of a metallic plate is provided instead of the concave portion core body 3a, etc., provided in Embodiments 1 to 3 shown in FIG. 1. Moreover, the core drill of Embodiment 4 shown in FIG. 9 is used with the countersinking cutting blades 23, etc., implanted in the lower surface of the concave portion disc 3c. Except for these points, the core drill of Embodiment 4 has the same construction as those of Embodiments 1 to 3, and the procedure of drilling is also the same between the core drill of Embodiment 4 and the core drills of Embodiments 1 to 3, so that detailed explanations thereof are omitted here.

As shown in FIG. 11(a), the core drill of Embodiment 4 shown in FIG. 9 can be used with the countersinking cutting blades 23 implanted in the cutting blade implanted holes 22 of the concave portion disc 3c. The cutting blades 13 and 23 are set such that the inner periphery of the rotational trajectory of the countersinking cutting blades 23 overlaps the outer periphery of the rotational trajectory of the drill cutting blades 13.

The core drill of Embodiment 4 shown in FIG. 9 can drill a hole with respect to the object to be drilled A in the same manner as the core drill of Embodiment 1 shown in FIG. 1. However, since the countersunk portion C shown in FIG. 4 is formed by the countersinking cutting blades 23, the drill core body 2 needs to be inserted into the cut hole B to a position at which the countersinking cutting blades 23 can cut the object to be drilled A. In accordance with the core drill of Embodiment 4, as with the core drill of Embodiment 1, as shown in FIG. 4, the cut hole B can be formed by the drill cutting blades 13 with respect to the object to be drilled A, and the countersunk portion C can be formed by the countersinking cutting blades 23 with respect to the opening end portion of the cut hole B so as to have a stepped-down shape. In addition, the cut hole B and the countersunk portion C can be formed in one step.

Moreover, in the concave portion disc 3c, the chamfering cutting blades 23a formed as the inclined blades capable of chamfering can be implanted as shown in FIG. 11(b) instead of the countersinking cutting blades 23 implanted in the cutting blade implanted holes 22 formed at positions closest from the rotation center of the concave portion disc 3c. The concave portion disc (concave portion forming member 3) 3C provided with the chamfering cutting blades 23a can be used for the drilling operation. In accordance with the core drill in which the chamfering cutting blades 23a shown in FIG. 11(b) are implanted, as with the core drill of Embodiment 2 shown in FIG. 5, as shown in FIG. 6, the cut hole B can be formed by the drill cutting blades 13 with respect to the object to be drilled A, and the inclined chamfered portion D can be formed by the chamfering cutting blades 23a with respect to the opening end portion of the cut hole B. In addition, the cut hole B and the chamfered portion D can be formed in one step.

Further, as shown in FIG. 11(c), the core drill can be used with the groove cutting blades 23b implanted in the cutting blade implanted holes 22 formed on the concave portion disc 3c which are different from the above cutting blade implanted holes 22. The cutting blade implanted holes 22 in which the groove cutting blades 23b are implanted are provided radially outside the cutting blade implanted holes 22 in which the countersinking cutting blades 23 and chamfering cutting blades 23a shown in FIGS. 11(a) and 11(b) are implanted.

In accordance with the core drill in which the groove cutting blades 23b shown in FIG. 11(c) are implanted, as with the core drill of Embodiment 3 shown in FIG. 7, as shown in FIG. 8, the cut hole B can be formed by the drill cutting blades 13 with respect to the object to be drilled A, and the annular groove portion E having a larger diameter than the cut hole B can be formed outside the opening end portion of the cut hole B by the groove cutting blades 23b. In this case, the cylindrical remaining portion e is formed between the cut hole B and the annular groove portion E. By removing the cylindrical remaining portion e, the countersunk portion C (shown by a dashed line) having an intended size can be obtained. The cylindrical remaining portion e can be removed by, for example, using a simple tool at worksites, and then the countersunk surface may be formed.

As described above, the present invention is the core drill including the connection holding means 17 capable of attaching the drill core body 2 and the concave portion forming member 3 to the base body 1 having the shank 5 by connecting the drill core body 2 and the concave portion forming member 3 to each other and also capable of fixing (locking) the drill core body 2 and the concave portion forming member 3 to the base body 1. The connection holding means 17 is not limited to the above construction. Various connection holding means may be used to fix the drill core body 2 and the concave portion forming member 3 to the base body 1.

INDUSTRIAL APPLICABILITY

As above, the core drill according to the present invention has an advantageous effect of, when forming a large-diameter cut hole by drill cutting blades with respect to an object to be drilled, such as concrete, being able to, for example, easily form a countersunk portion or a chamfered portion with respect to an opening end portion of the cut hole. The present invention is suitable for application to this kind of core drill, etc.

The invention claimed is:

1. A core drill comprising: a base body including a shank; and a drill core body including a drill cutting blade, a connection opening portion of the drill core body being attached to the base body, wherein the connection opening portion of the drill core body is provided with a concave portion forming member including a large-diameter hole cutting blade, the large-diameter hole cutting blade is provided outside the drill cutting blade in a radial direction of the connection opening portion, and the base body, the drill core body and the concave portion forming member are connected to each other by causing an engagement projection formed so as to project in the connection opening portion of the drill core body to engage with an engagement concave portion provided on the base body, and wherein the concave portion forming member includes a concave portion core body which is radially larger than the drill core body, the large-diameter hole cutting blade is provided at a lower end opening edge portion of the concave portion core body, an upper end opening portion of the concave portion core body is reduced in diameter so as to form a connection opening portion, and the connection opening portion externally fits the connection opening portion of the drill core body so as to be connected thereto.

2. The core drill according to claim 1, wherein the connection opening portion of the drill core body is detachably attached to the base body, and the concave portion forming member is detachably attached to the connection opening portion.

3. The core drill according to claim 1, wherein the large-diameter hole cutting blade is a countersinking cutting blade which forms a countersunk portion with respect to a cut hole formed by the drill cutting blade.

4. The core drill according to claim 1, wherein the large-diameter hole cutting blade is a chamfering cutting blade whose cutting edge is inclined with respect to a center axis direction of the base body and which forms a chamfered portion with respect to a cut hole formed by the drill cutting blade.

5. The core drill according to claim 3, wherein an inner periphery of a rotational trajectory is formed when the rotating large-diameter hole cutting blade contacts or overlaps an outer periphery of a rotational trajectory formed when the drill cutting blade rotates.

6. The core drill according to claim 1, wherein the large-diameter hole cutting blade is a groove cutting blade which forms an annular groove portion which is located outside a cut hole, formed by the drill cutting blade, so as to be spaced apart from the cut hole.

7. The core drill according to claim 1, wherein a cutting concave portion is formed at an opening edge of the connection opening portion of the drill core body, a second engagement projection shaped so as to correspond to the cutting concave portion is formed at a connection opening portion of the concave portion forming member, and the second engagement projection engages with the cutting concave portion so that the drill core body and the concave portion forming member are connected to each other so as not to be rotatable in a circumferential direction.

8. The core drill according to claim 7, wherein:
the base body includes a connection holding means;
the connection holding means includes a core body attachment portion having a shoulder portion formed at a lower portion of the base body;
the shoulder portion is formed at an outer peripheral portion of an attachment plate; and
the drill core body is attached to the base body in such a manner that: the core body attachment portion is fittingly inserted into the connection opening portion of the drill core body; the engagement projection projecting in the connection opening portion engages with an engagement concave portion provided on the core body attachment portion; and the concave portion forming member attached to the drill core body is fixed to the core body attachment portion by causing the shoulder portion of the core body attachment portion to press contact the engagement projection provided on the connection opening portion.

* * * * *